No. 782,781. PATENTED FEB. 14, 1905.
O. A. KAHLER & F. T. WITHAM.
GRAPPLE.
APPLICATION FILED AUG. 9, 1904.
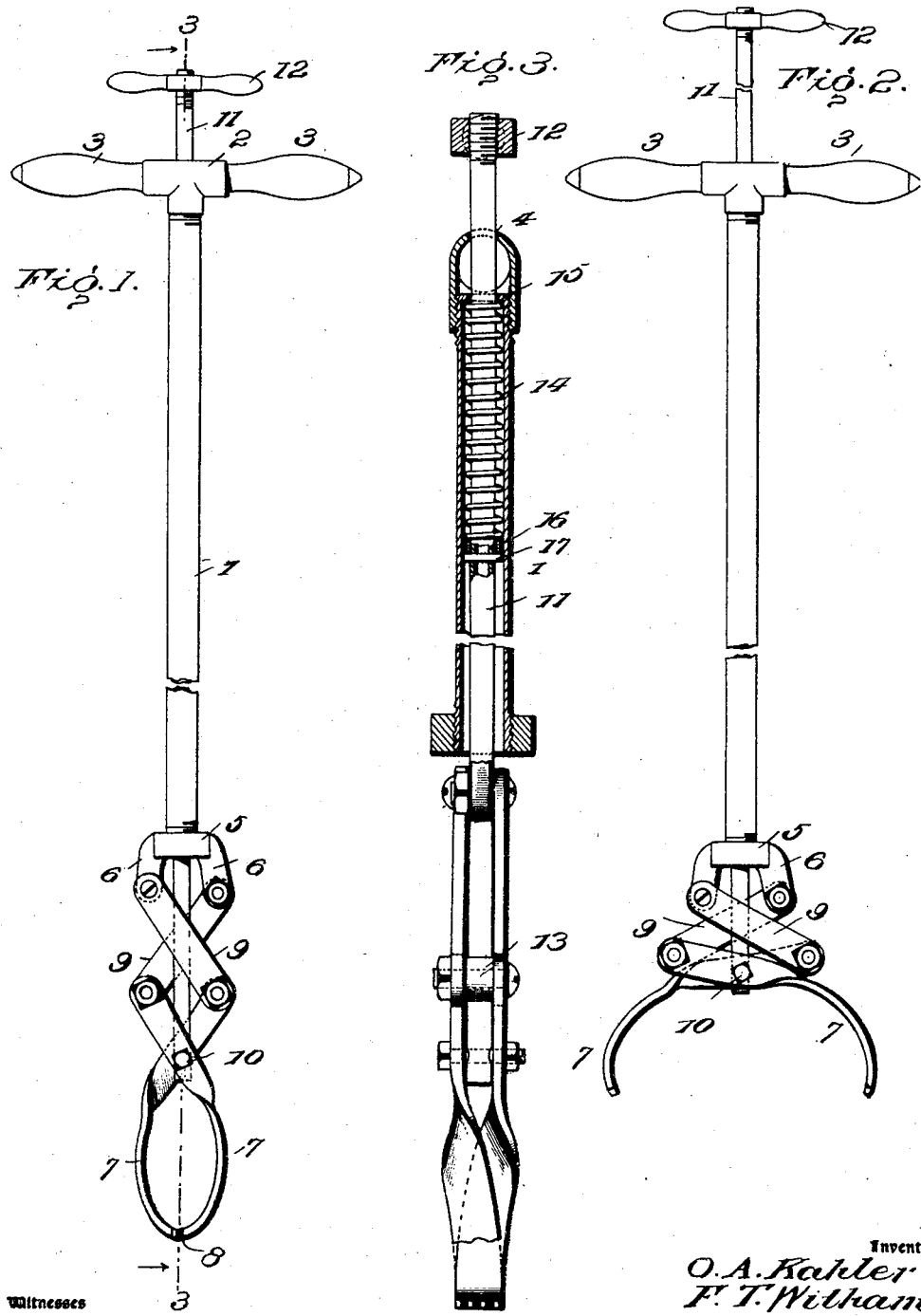
Witnesses
Inventors
O. A. Kahler
F. T. Witham
By David W. Gould.
Attorney No. 782,781. Patented February 14, 1905.

UNITED STATES PATENT OFFICE.

OSCAR A. KAHLER AND FRANCIS T. WITHAM, OF PHILADELPHIA, PENNSYLVANIA.

GRAPPLE.

SPECIFICATION forming part of Letters Patent No. 782,781, dated February 14, 1905.

Application filed August 9, 1904. Serial No. 220,145.

*To all whom it may concern:*

Be it known that we, OSCAR A. KAHLER and FRANCIS T. WITHAM, citizens of the United States, residing at Philadelphia, in the county of Philadelphia and State of Pennsylvania, have invented new and useful Improvements in Grapples, of which the following is a specification.

The invention relates to an improvement in grapples, and particularly to an adjustable crab for use in withdrawing obstructions from drains or other similar inaccessible places.

The invention is designed to simplify structures of this character and arrange the parts to promote the general efficiency of the device.

The invention, broadly stated, comprises a tube connected at its lower end to a grapple and a rod sliding within the tube and also connected to the grapple.

The invention in its preferred form is illustrated in the accompanying drawings, wherein—

Figure 1 is a side elevation of a grapple constructed in accordance with our invention, the parts being shown in a position occupied when the grapple-jaws are closed. Fig. 2 is a similar view showing the grapple-jaws open. Fig. 3 is an enlarged central longitudinal section on the line 3 3 of Fig. 1.

Referring to the drawings, wherein like reference-numerals designate like parts throughout the several views, my improved grapple comprises a tube or pipe 1, threaded at its upper end to receive a T connection 2, the branches of which are arranged to receive handles 3. The T connection is provided with an opening 4 in vertical alinement with its connection with pipe 1, as shown in Fig. 3, for a purpose hereinafter described. The lower end of the pipe is threaded to receive a yoke 5, having downwardly-projecting arms 6 at diametrically opposite points.

7 represents the grapple-jaws, of bowed shape, having their free ends serrated to provide teeth 8, the upper ends of the jaws being connected to links 9, the opposite ends of which are connected to the lower ends of the yoke-arms 6. The grapple-arms are each formed of a single piece of metal, the bowed portion of which is on edge with relation to the plane of the handle 3, the upper ends of the arms being twisted to project said upper portion to a plane at right angles to the plane of the lower portion of the grapple-jaws, as clearly shown in the drawings. The grapple-jaws are crossed and pivotally connected together by a bolt 10, and the links 9 are also crossed with relation to each other, so that the upper end of one grapple-jaw is connected to the yoke-arm on the opposite side of the device.

A rod 11 passes loosely through the pipe 1, projecting at the upper end through the opening 4 in the T connection 2 and at the lower end connected directly to the pivot-bolt 10 of the grapple-jaws. The upper end of the rod 11 is threaded to receive a handle 12 and at its lower end passes between the links 9 and the upper portions of the grapple-jaws, spacing-sleeves 13 being preferably arranged on the bolts connecting the grapple-jaws and links to permit the passage of the rod therebetween.

A spring 14 is mounted within the tube 1 and arranged to project the rod 11 in a downward direction. The spring is seated against the burred end 15 of the pipe 1 and at its lower end against a collar 16, loosely encircling the rod 11 and bearing against a pin 17, passing through the rod.

The pipe 1 and rod 11 are to be of course of any length desired, though we prefer to make them of a certain standard length and adapt the device for extension by disconnecting handles 3 and 12 and T connection 2 and inserting additional lengths to pipe 1 and rod 11 by means of sockets or sleeves, the handles and T connection to be readjusted to proper position on the free ends of such added lengths.

In operating the device the grapple is inserted in the drain or pipe from which the obstruction is to be removed until the obstruction is reached. The handle 12 is then drawn upward—that is, away from the handle 3—which upward movement of rod 11 draws up the connection between the lower end of the rod and the grapple-jaws and through the medium of the cross-links 9 opens the jaws 7. The device is then forced against the obstruction by means of a handle 3, and the handle 12 is released, when the spring 14 will operate to force the rod downward, closing the grapple and holding the teeth 8 thereof in engagement with the obstruction through the pressure exerted by the spring 14.

It will be noted that the handles 12 and 3 may be pressed together by the operator, tending to a more firm grip of the grapple-jaws upon an obstruction, and that though the use of the spring 14 is preferred it may be dispensed with and the pressure upon the obstruction maintained by the operator forcing the handles 12 and 3 toward each other.

It will be noted that in use of the device the roll 11 is drawn in an upward direction to open the grapple-jaws and forced in a downward direction to close them. This is particularly desirable in a device of this character, as it permits the operator to force the device as an entirety to the obstruction through the medium of the handle 3 and opening the device by raising up upon the handle 12, which operates to elevate and at the same time open the jaws 7. The downward pressure upon handle 12 is readily effected by grasping both handles at once, as will be evident.

It is understood, of course, that if desired, the grapple may be introduced into the drain in an open condition, though we prefer the reverse operation.

What we claim as new is—

1. A grapple comprising a tube, a rod movable lengthwise in the tube, grapple-jaws pivotally connected to the lower end of the rod, said jaws being opened by an upward movement of the rod, and links connecting the grapple-jaws and tube.

2. A grapple comprising a tube, having a handle at one end, a rod slidable within and projecting through the tube, said rod having a handle at the end contiguous the handle end of the tube, a grapple pivotally connected to the lower end of the rod, links connecting said grapple and tube, and a spring encircling the rod within the tube and operating to close the jaws of the grapple.

3. A grapple comprising a tube, a yoke provided with arms secured to the lower end of the tube, a rod movable lengthwise and within the tube, grapple-jaws pivoted to the lower end of rod, links connecting the ends of said jaws with the yoke-arms, a spring within the tube and encircling the rod, said spring bearing at one end against the tube and at the opposite end against the rod and a handle for moving the rod against the tension of said spring to open the jaws.

4. A grapple comprising a tube, a yoke provided with arms secured to the lower end of the tube, a rod movable lengthwise and within the tube, grapple-jaws pivoted to the lower end of the rod, crossed links connecting the ends of said jaws with the yoke-arms, a spring within the tube and encircling the rod, said spring bearing at one end against the tube and at the opposite end against the rod and a handle for moving the rod against the tension of said spring to open the jaws.

In testimony whereof we have hereunto set our hands this 8th of August, 1904.

OSCAR A. KAHLER.
FRANCIS T. WITHAM.

Witnesses:
M. GETZ.
W. A. WITHAM.